United States Patent
Chung et al.

(10) Patent No.: US 8,792,199 B2
(45) Date of Patent: Jul. 29, 2014

(54) METHOD AND APPARATUS FOR SERVO PATTERN WRITING

(75) Inventors: Da Woon Chung, Suwon-si (KR); Byoung Kul Ji, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 97 days.

(21) Appl. No.: 13/536,992

(22) Filed: Jun. 28, 2012

(65) Prior Publication Data

US 2013/0163115 A1 Jun. 27, 2013

(30) Foreign Application Priority Data

Jun. 28, 2011 (KR) .................. 10-2011-0062643

(51) Int. Cl.
*G11B 5/02* (2006.01)

(52) U.S. Cl.
USPC .................. 360/55; 360/49; 360/40; 360/39

(58) Field of Classification Search
None
See application file for complete search history.

(56) References Cited

U.S. PATENT DOCUMENTS

| | | | |
|---|---|---|---|
| 8,477,442 B2 * | 7/2013 | Albrecht et al. | 360/48 |
| 2005/0122624 A1 * | 6/2005 | Ng | 360/133 |
| 2006/0126206 A1 * | 6/2006 | Takagi et al. | 360/46 |

* cited by examiner

*Primary Examiner* — Muhammad N Edun
(74) *Attorney, Agent, or Firm* — Cesari & Reed, LLP; Kirk A. Cesari; Christian W. Best

(57) ABSTRACT

Disclosed are servo pattern writing methods and apparatuses for performing the same. In one example, a method may include providing a plurality of disks having reference servo patterns written thereon; writing align patterns aligned with each other in a horizontal direction of the disk surface, on the plurality of disks, using a reference servo pattern of one of the plurality of disks; and writing a final servo pattern on each disk, using the align pattern written on each disk.

20 Claims, 11 Drawing Sheets

US 8,792,199 B2

METHOD AND APPARATUS FOR SERVO PATTERN WRITING

CROSS-REFERENCE TO RELATED APPLICATION

This application claims priority under 35 U.S.C. §119(a) of Korean Patent Application No. 10-2011-0062643, filed on Jun. 28, 2011, the entire disclosure of which is hereby incorporated by reference.

BACKGROUND

The present disclosure relates to a servo pattern writing method of a hard disk drive (HDD) and an HDD manufactured by the same, and more particularly, to a servo pattern writing method of an HDD capable of writing a servo pattern written on a servo track of a disk, and an HDD manufactured by the same.

A hard disk drive (HDD) is a data storage device configured to recode a digital electronic pulse including data information on a disk by converting into a magnetic field, or configured to read data written on a disk. Such HDD is being utilized as a representative auxiliary memory device of a computer system, due to its advantage to record and read (reproduce) a large amount of data at a high speed.

In order to successfully perform read and write operations of such HDD, a precise position should be searched by reading a servo pattern written on a servo track of the disk.

In the conventional art, the servo pattern is written onto a disk assembled to the HDD by using a servo track writer. The method for writing a servo pattern on a disk using a servo track writer has a disadvantage that accuracy of writing is degraded due to Non-Repeatable Run Out (NRRO), disk flutter, motor vibration, etc. Furthermore, costs associated with servo writing are increased according to usages of a position estimator and an encoder.

In order to solve such problems, a self-servo write method and an offline servo track write (OLSTW) method have been developed.

According to the self-servo write method, a reference servo pattern is firstly written by a servo track writer, on one of disks assembled to each other. Then, the HDD records a final servo pattern on the disks, with reference to a reference servo pattern written on a reference disk by a servo track writer.

In the self-servo write method, the quality of a final servo pattern is determined according to accuracy of the reference servo pattern. Furthermore, the self-servo write method is advantageous in the aspect of cost, since dependency on the conventional servo track writer is small. However, the self-servo write method is disadvantageous in that time for self servo writing is increased.

According to the OLSTW method, a servo pattern is pre-written on disks by using an offline servo track writer before mounting the disks to the HDD. The OLSTW method is advantageous in that productivity is greatly enhanced since a servo pattern is written at a time on 10 or more disks by an offline servo track writer.

A final servo pattern can be directly written by an offline servo track writer. However, an offline servo copy method for copying a final servo pattern after writing a reference servo pattern and then assembling an HDD. In this case, the productivity can be more enhanced.

A method for writing a reference servo pattern includes a burst method and a spiral method. According to the burst method, a reference servo pattern is spirally written on a disk, and a final servo pattern is written with reference to the reference servo pattern. According to the spiral method, a spiral reference servo pattern of a spiral shape is written on each disk, and a final servo pattern is written with reference to the spiral reference pattern. It is known that the offline servo copy method using spiral reference servo patterns is the most productive.

However, the offline servo copy method has the following problems. Firstly, the offline servo copy method uses a bank copy method for assembling a blank disk with a reference disk on which a reference servo pattern has been written, and then simultaneously writing final servo patterns on the entire disk surface from the reference servo patterns. In this case, the quality of a pattern onto which servo copy is performed is lowered as the disk surface is farther from the reference servo patterns according to a mechanical characteristic of the assembled HDD.

An HDD may not perform bank servo copy due to such mechanical limitations. In this case, multi pass servo copy, not the bank copy should be applied.

According to the multi pass servo copy, the final servo patterns are not simultaneously written on the surface of the entire disks unlike the bank copy, but servo copy is performed by using the reference servo patterns of the disks. In this case, servo copy is performed a plurality of times in the aspect of the entire drive, which is the reason why the servo copy is called multi pass servo copy.

According to the multi pass servo copy, the final servo patterns are independently written on the disks by using the reference servo patterns written onto the surface of all the disks. Therefore, only when the reference servo patterns written on the disks are aligned with each other, the final servo patterns which are to undergo servo copy from the reference servo patterns are aligned.

However, the reference servo patterns of a plurality of reference disks formed by an offline servo track writer are not always aligned with each other. In this case, as shown in FIG. 1, final servo patterns 700 and 800 are not aligned with each other in a horizontal direction of the disk surface.

FIG. 1 is a view illustrating a reference servo pattern and a final servo pattern on the same plane, the patterns respectively written on two disks, during offline multi pass servo copy according to one embodiment of the conventional art. As shown in FIG. 1, if a reference servo pattern 500 of a disk 1 is not aligned with a reference servo pattern 600 of a disk 2, the final servo pattern 700 of the disk 1 and the final servo pattern 800 of the disk 2 servo-copied from the reference servo pattern 500 of the disk 1 and the reference servo pattern 600 of the disk 2, respectively are not aligned with each other in a horizontal direction of the disk surface.

Even if the final servo patterns are not aligned with each other, a mis-aligned amount can be measured to be compensated during head switching. However, such process is very difficult and performance of the head switching may be degraded. Therefore, in case of applying the multi pass servo copy, the OLSTW method cannot be used, but the conventional servo track writer should be used. This may lower the productivity.

SUMMARY

The embodiments herein disclose servo pattern writing methods and apparatuses for performing the same. In some examples, a final servo pattern may be written on disks through a multi pass servo copy, which may include the final servo patterns written on the disks using spiral reference patterns.

In another example, a method may include providing a plurality of disks having reference servo patterns written thereon; writing align patterns aligned with each other in a horizontal direction of the disk surface, on the plurality of disks, using a reference servo pattern of one of the plurality of disks; and writing a final servo pattern on each disk, using the align pattern written on each disk.

In yet another example, an apparatus may include a plurality of data storage discs having reference servo patterns mis-aligned with each other between the data storage discs, in a horizontal direction of a surface of the data storage discs. The data storage discs may also have final servo patterns aligned with each other between the data storage discs, in a horizontal direction of the surface of the data storage discs.

BRIEF DESCRIPTION OF THE DRAWINGS

The accompanying drawings, which are included to provide a further understanding of the preferred embodiments and are incorporated in and constitute a part of this specification, illustrate exemplary embodiments and together with the description serve to explain the principles of the disclosure.

In the drawings.

DETAILED DESCRIPTION

Figure 1:
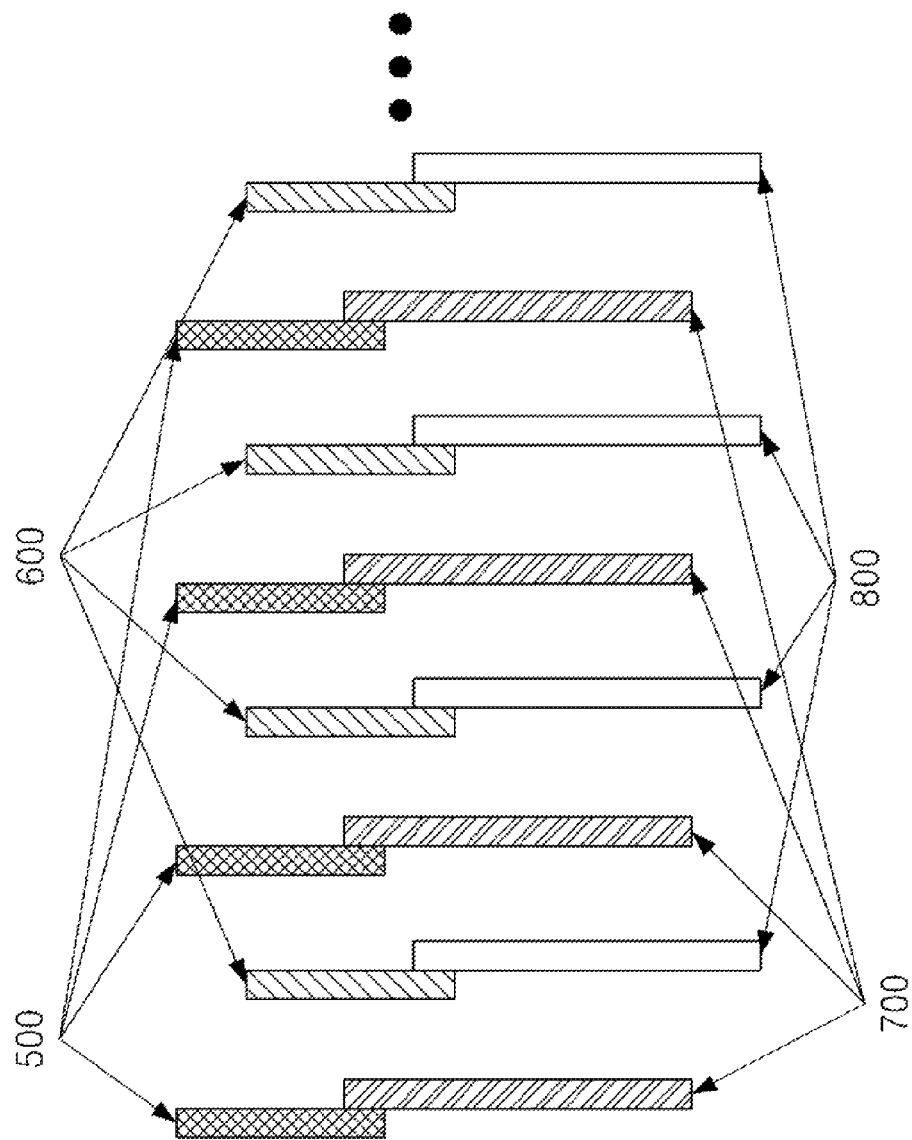
FIG. 1 is a view illustrating a reference servo pattern and a final servo pattern on the same plane, the patterns respectively written on two disks, during offline multi pass servo copy according to one embodiment of the conventional art.

Description will now be given in detail of the exemplary embodiments, with reference to the accompanying drawings. For the sake of brief description with reference to the drawings, the same or equivalent components will be provided with the same reference numbers, and description thereof will not be repeated. It should be understood that the detailed description and specific examples, while indicating preferred embodiments, are given by way of illustration only, since various changes and modifications within the spirit and scope of the disclosure will become apparent to those skilled in the art from the detailed description.

An aspect of the detailed description is to provide a servo pattern writing method of a hard disk drive (HDD) capable of solving a mis-align problem between servo tracks on different disks, the most serious problem in an offline multi pass servo copy method for performing servo copy using reference servo patterns of a plurality of reference disks formed by an offline servo track writer, and an HDD manufactured by the same.

To achieve these and other advantages and in accordance with the purpose of this specification, as embodied and broadly described herein, there is provided a servo pattern writing method of a hard disk drive (HDD), the method comprising: providing a plurality of disks having reference servo patterns written thereon; writing align patterns aligned with each other in a horizontal direction of the disk surface, on the plurality of disks, using a reference servo pattern of one of the plurality of disks; and writing a final servo pattern on each disk, using the align pattern on each disk.

In step of providing a plurality of disks having reference servo patterns written thereon, the reference servo patterns may be written on the plurality of disks by an offline servo track writer.

The reference servo pattern may include a spiral reference pattern written on the disk in a spiral shape.

The reference servo pattern may further include a burst reference pattern radially written on at least part of an outer diameter (OD) of the disk. And, the align pattern may be an align burst pattern written on each of the plurality of disks, by using the spiral reference pattern of one of the plurality of disks, after a read/write head is moved to a copy start location of the burst reference pattern of one of the plurality of disks.

The step of writing align burst patterns may include making one read/write head among a plurality of read/write heads be in a ready status, said one read/write head corresponding to the disk having the burst reference pattern; moving said one read/write head, to a copy start location of the burst reference pattern; and copying the align burst pattern on the disks using the entire read/write heads in a bank write manner, based on the spiral reference servo pattern of the disk corresponding to said one read/write head.

The step of writing a final servo pattern may be a step of multi pass servo copy for performing servo copy using the align burst pattern and the spiral reference pattern each written on each disk.

The step of writing a final servo pattern may include making a read/write head to perform servo copy be in a ready status for the align burst pattern, and then moving the read/write head to a copy start location; after the read/write head is in a ready status for the align burst pattern, performing track seeking with respect to a copy start track, and then performing a jump to spiral operation for execution of track following using the spiral reference patterns; and writing a final servo pattern by the read/write head which is to perform servo copy, using the spiral reference pattern.

The reference servo patterns written on the plurality of disks may be reference servo patterns mis-aligned with each other between the disks, in a horizontal direction of the surface of the plurality of disks.

The reference servo pattern written on each of the plurality of disks may include a spiral reference pattern written on the disk in a spiral shape. The reference servo pattern written on at least one of the plurality of disks may further include a burst reference pattern radially written on at least part of an outer diameter (OD) of the disk. And, the reference servo patterns mis-aligned with each other between the disks may be the spiral reference patterns.

To achieve these and other advantages and in accordance with the purpose of this specification, as embodied and broadly described herein, there is also provided a hard disk drive (HDD), the HDD comprising: a plurality of disks on which data is written; and a plurality of read/write heads configured to write or read out data onto/on the plurality of disks, wherein the plurality of disks include reference servo patterns mis-aligned with each other between the disks, in a horizontal direction of the surface of the plurality of disks; and final servo patterns aligned with each other between the disks, in a horizontal direction of the surface of the plurality of disks.

The plurality of disks may further include align patterns aligned with each other between the disks, in a horizontal direction of the surface of the disks.

The reference servo pattern may include a burst reference pattern radially written on the disk; and a spiral reference pattern written on the disk in a spiral shape. The align pattern may be an align burst pattern radially written on the disk by using the burst reference pattern and the spiral reference pattern. The align burst pattern may be disposed between the burst reference pattern and the final servo pattern, in a circumferential direction of the disk.

The burst reference pattern, the align burst pattern and the final servo pattern may be disposed on the same shaft in a radial direction of the disk.

The reference servo pattern may be disposed at an outer diameter (OD) than the final servo pattern.

The reference servo pattern may be a burst reference servo pattern radially written on the disk, and may further include an align pattern written on the disk by using the burst reference servo pattern.

The present embodiments may have the following advantages.

Firstly, the present embodiments can solve a mis-align problem between servo tracks on different disks, the most serious problem in an offline multi pass servo copy method for performing servo copy using a reference servo pattern of each reference disk formed by an offline servo track writer. This can enhance the quality of the servo-copied final servo patterns, and can allow an OLSTW method having high productivity even if bank servo copy cannot be implemented.

Figure 2:
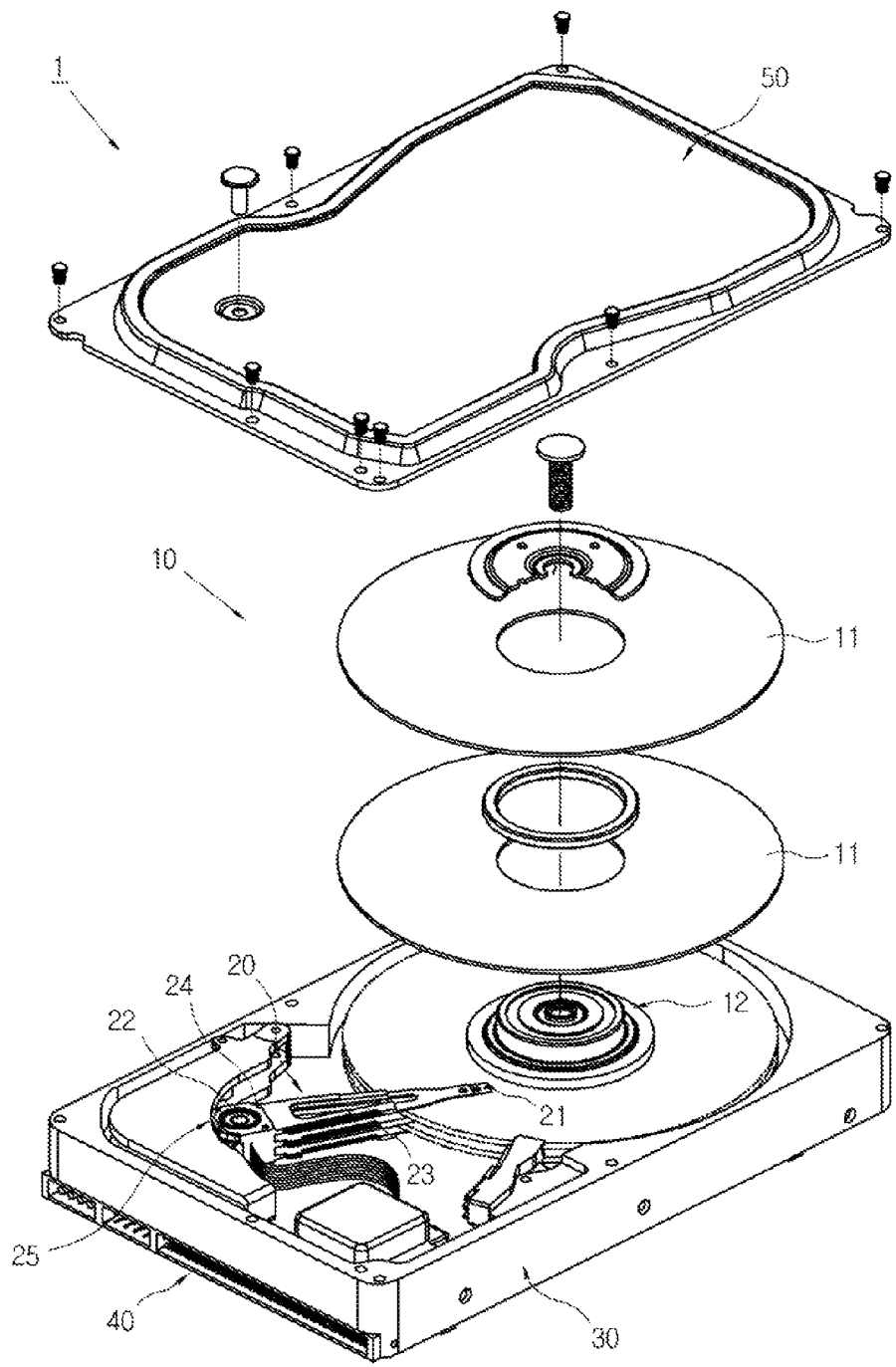
FIG. 2 is a disassembled perspective view of a hard disk drive (HDD), to which a servo pattern writing method of an HDD according to one embodiment of the present disclosure is applied.

Turning now to the drawings, FIG. 2 is a disassembled perspective view of a hard disk drive (HDD), to which a servo pattern writing method of an HDD according to one embodiment is applied.

As shown in FIG. 2, the HDD 1 according to one embodiment comprises a disk pack 10 including a disk 11 configured to write and store data, and a spindle motor 12 configured to support and rotate the disk 11; a head stack assembly (HSA) 20 configured to read data on the disk 11; a base 30 onto which the above components are assembled; a printed circuit board assembly (PCBA) 40 coupled to a lower part of the base 30, and configured to control each type of components by mounting circuitry components onto a printed circuit board (PCB); and a cover 50 configured to cover the base 30.

The head stack assembly 20 is a carriage for writing (recording) data onto the disk 11, or reading out data on the disk 11. The HSA 20 includes a read/write head 21 for recording data onto the disk 11 or reading out data on the disk 11, an actuator arm 23 which moves or pivots with respect to the disk 11 around a pivot shaft 22 as a pivoting center so that the read/write head 21 can access data on the disk 11, a pivot shaft holder 24 configured to rotatably support the pivot shaft 22, and to which the actuator arm 23 is coupled for support, and a bobbin (not shown) disposed at the pivot shaft holder 24 in the opposite direction to the actuator arm 23, and on which a voice coil motor (VCM) coil (not shown) is wound so as to be located between magnets.

Figure 3:
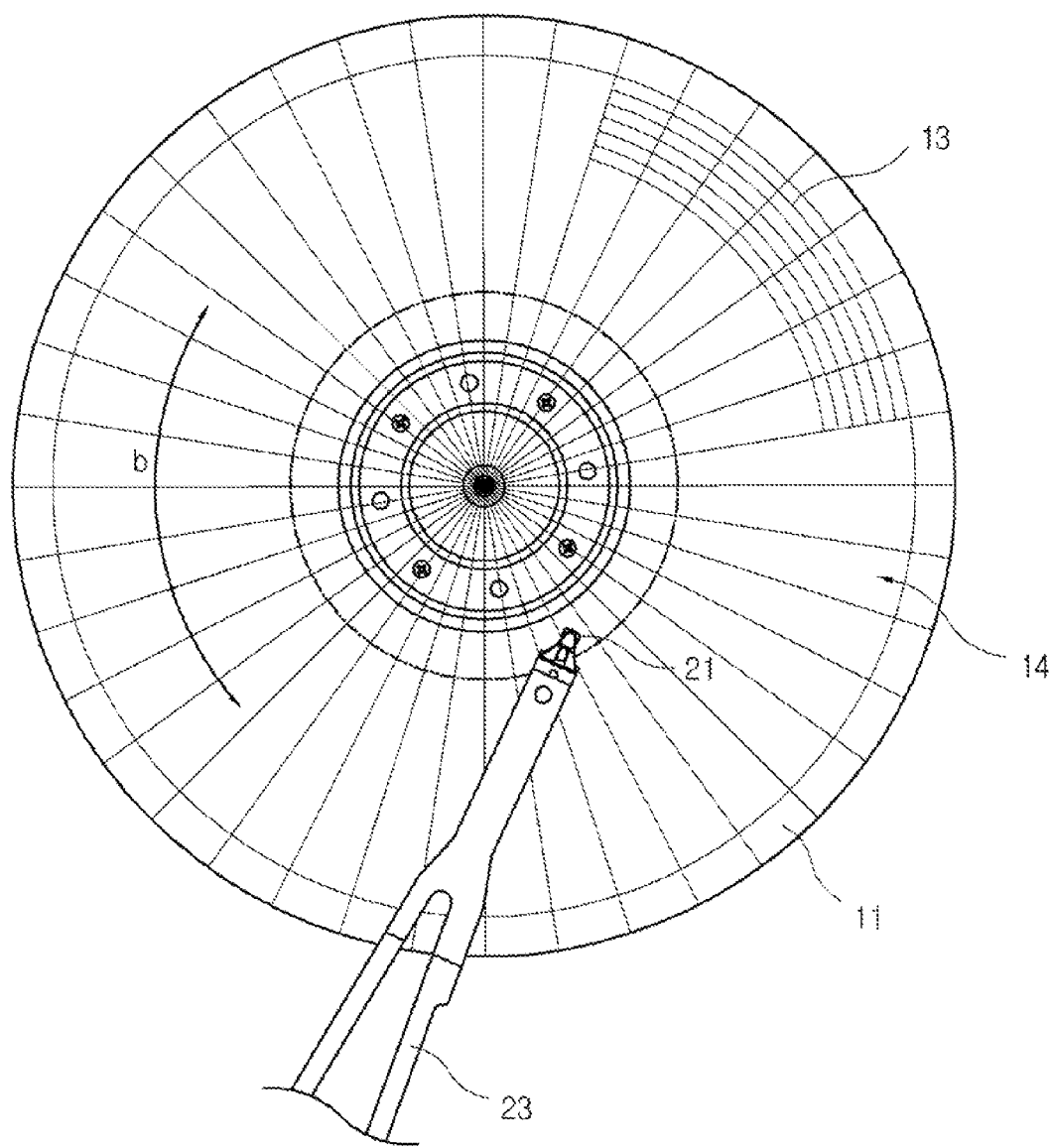
FIG. 3 is a schematic planar view showing a disk region in the HDD of FIG. 2.
Figure 4:
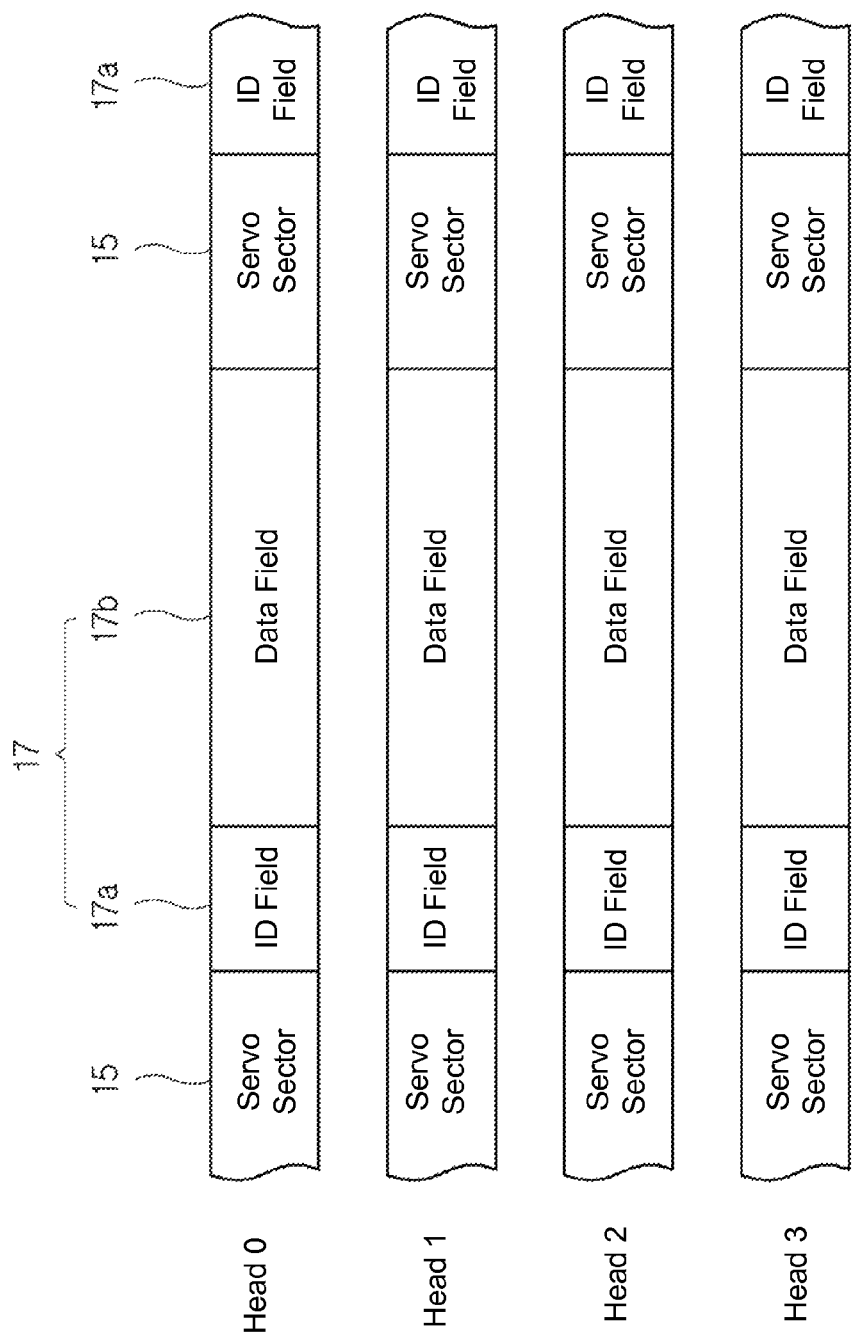
FIG. 4 is a view illustrating a data format of each track in the HDD of FIG. 2.
Figure 5:
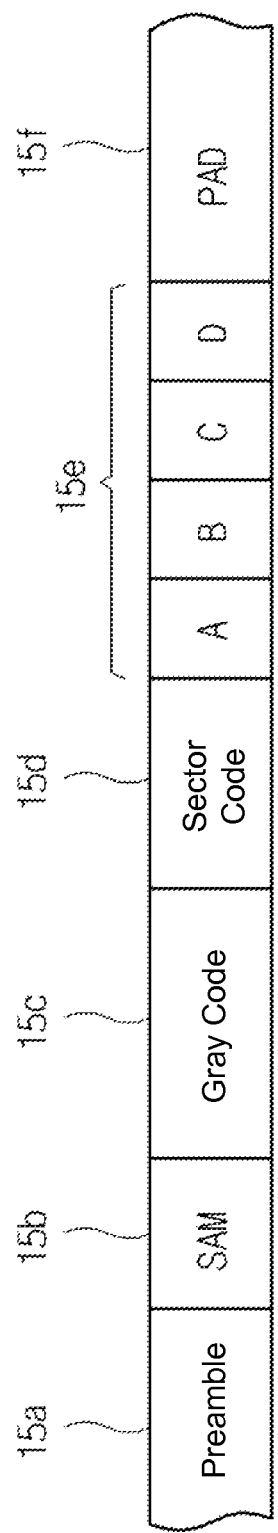
FIG. 5 is a view illustrating a detailed configuration of a servo sector of FIG. 4.

FIG. 3 is a schematic planar view showing a disk region in the HDD of FIG. 2, FIG. 4 is a view illustrating a data format of each track in the HDD of FIG. 2, and FIG. 5 is a view illustrating a detailed configuration of a servo sector of FIG. 4.

As shown in FIG. 3, the disk 11 for writing and storing data includes tracks 13 serving as an object for storing servo information and data information, and sectors 14 in the form of unit objects and obtained by dividing the tracks 13 at the same interval on the basis of a rotation shaft center.

As shown in FIG. 4, each track 13 includes a servo sector 15 for servo controls such as track seeking or track following, and a data sector 17 for writing a user's data. Here, the servo sector 15 and the data sector 17 are alternately disposed on each track 13.

As shown in FIG. 5, each servo sector 15 includes a preamble 15a, a Servo Address Mark (SAM) 15b, a gray code 15c, a sector code 15d, burst signals A, B, C and D 15e, and a PAD 15f.

The preamble 15a is configured to provide a clock synchronization when reading servo information, and to provide a gap in front of a servo sector for indication of the servo sector. The preamble 15a is also called 'servo sync'. The SAM 15b is configured to inform start of a servo, and to provide synchronization for reading the subsequent gray code 15c. That is, the SAM 15b serves as a reference point for generating each type of timing pulses associated with servo controls.

The gray code 15c provides information on each track 13, i.e., track information. The sector code 15d provides a sector number. The burst signals A, B, C and D 15e provide position Error Signals (PES) required for track seeking and track following. And, the PAD 15f provides a transition margin from the servo sector to the data sector.

Returning to FIG. 4, the data sector 17 is positioned before and after the servo sector 15. And, the data sector 17 is categorized into an ID field 17a and a data field 17b.

Header information for identifying a corresponding data sector is written on the ID field 17a. And, digital data desired to be written by a user is written onto the data field 17b.

In order to read digital data recorded on the data field 17b or to write digital data onto the data field 17b through the read/write head 21, the read/write head 21 should be selectively positioned on a specific track. In order to selectively position the read/write head 21 on a specific track, a servo pattern existing on the servo sector 15 should be read. Therefore, the servo pattern plays a very important role in reading and writing data. Such servo pattern is written during a servo write process while an HDD is being fabricated.

Figure 6:
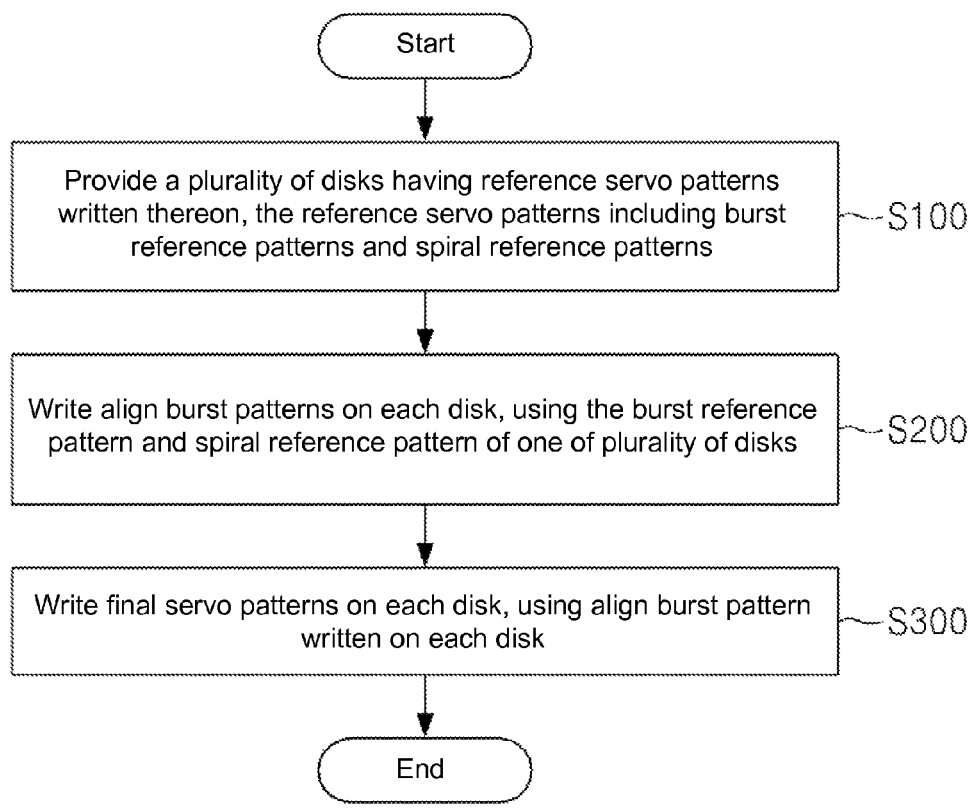
FIG. 6 is a flowchart sequentially illustrating a servo pattern writing method of an HDD according to one embodiment of the present disclosure.
Figure 7:
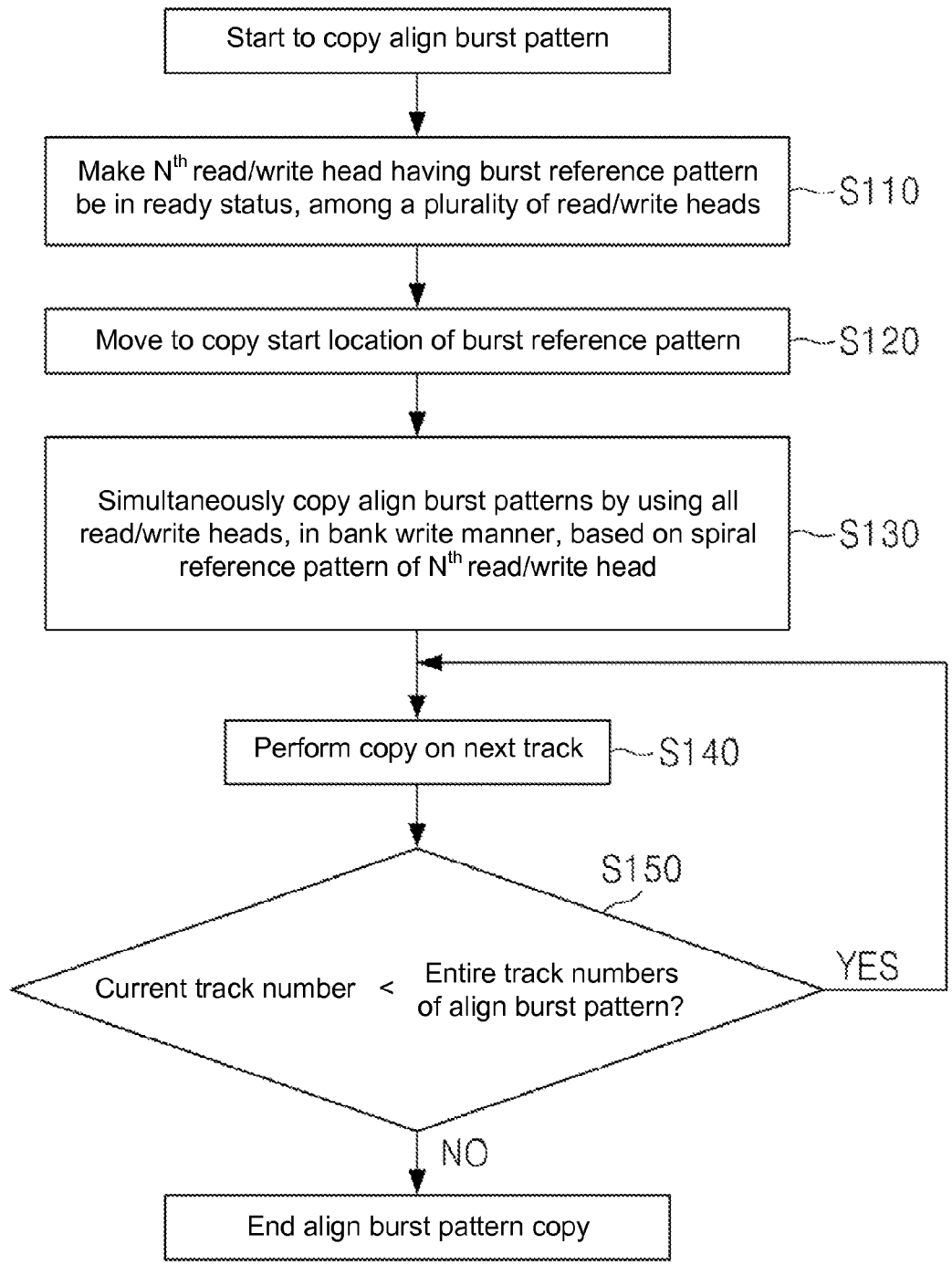
FIG. 7 is a flowchart illustrating a step of writing an align burst pattern in the servo pattern writing method of an HDD shown in FIG. 6.
Figure 8:
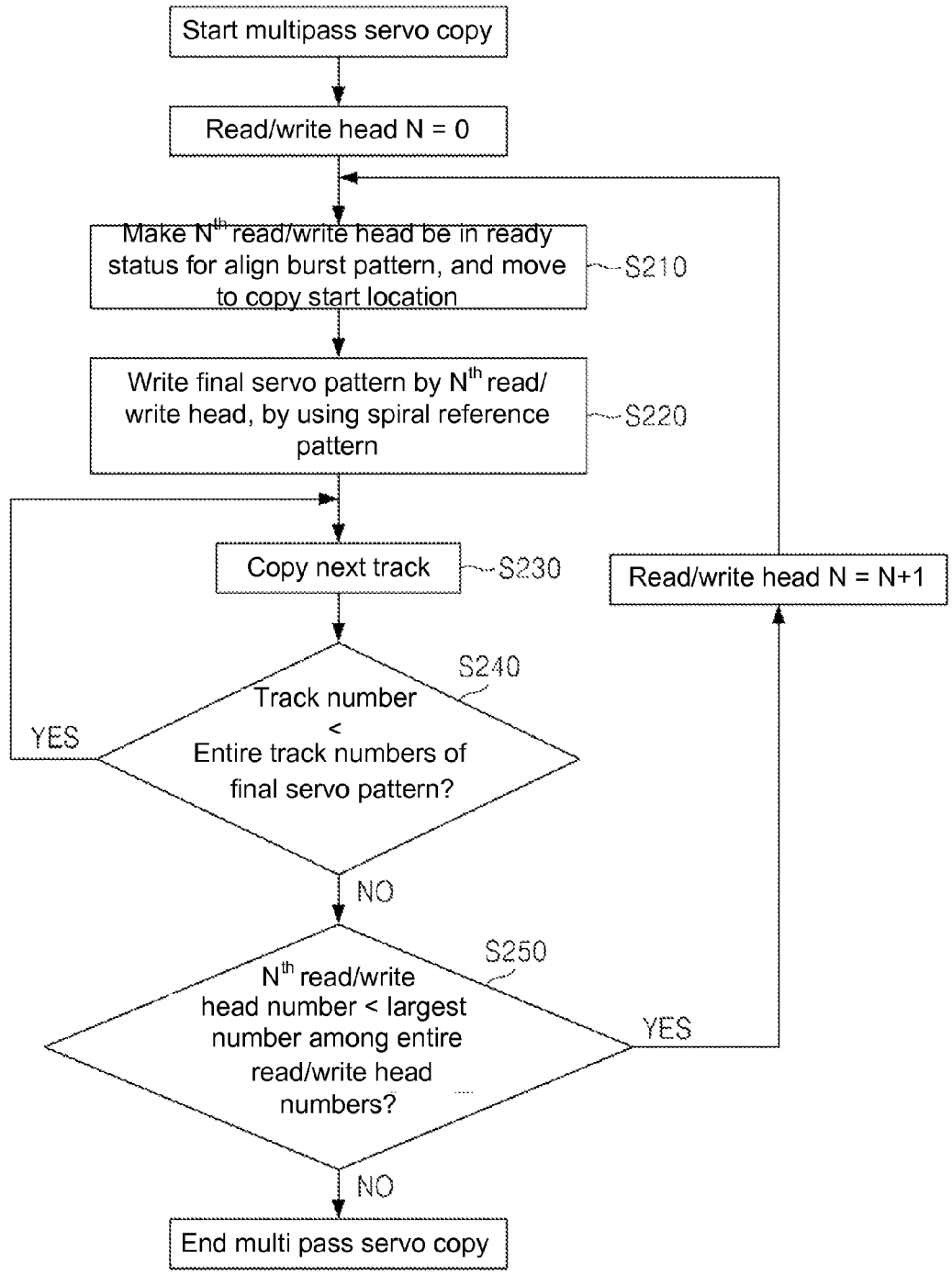
FIG. 8 is a flowchart illustrating a step of writing a final servo pattern in the servo pattern writing method of an HDD shown in FIG. 6.
Figure 9:
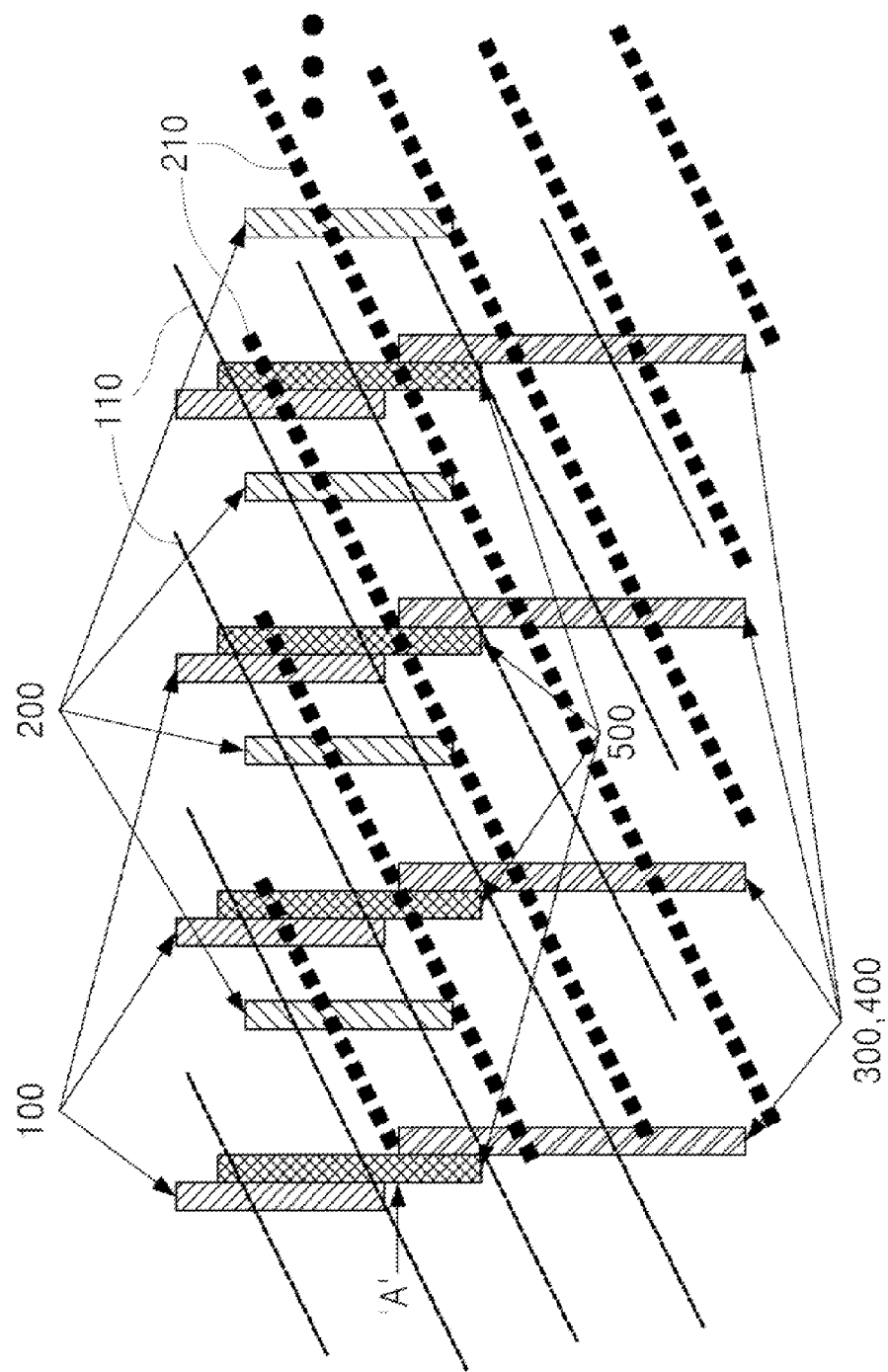
FIG. 9 is a view illustrating a reference servo pattern and a final servo pattern on the same plane, the patterns respectively written on two disks, by the servo pattern writing method of an HDD shown in FIG. 6.

FIG. 6 is a flowchart sequentially illustrating a servo pattern writing method of an HDD according to one embodiment, FIG. 7 is a flowchart illustrating a step of writing an align burst pattern in the servo pattern writing method of an HDD shown in FIG. 6, FIG. 8 is a flowchart illustrating a step of writing a final servo pattern in the servo pattern writing method of an HDD shown in FIG. 6, and FIG. 9 is a view illustrating a reference servo pattern and a final servo pattern on the same plane, the patterns respectively written on two disks, by the servo pattern writing method of an HDD shown in FIG. 6.

Referring to FIGS. 6 and 9, a servo pattern writing method of a hard disk drive (HDD) according to one embodiment comprises: providing a plurality of disks 11 having reference servo patterns written thereon, the reference servo patterns including burst reference patterns 100 and 200 and spiral reference patterns 110 and 210 (S100); writing align burst patterns 500 aligned with each other in a horizontal direction of the disk surface, on the plurality of disks 11, using a reference servo pattern of one of the plurality of disks 11 (S200); and writing final servo patterns 300 and 400 on the disks 11, using the align pattern on each disk 11 (S300).

Firstly, a plurality of disks 11 having reference servo patterns written thereon are provided.

The reference servo pattern includes burst reference patterns 100 and 200, and spiral reference patterns 110 and 210.

The spiral reference patterns 110 and 210 are written on the disks 11 in a spiral shape, and include a plurality of bits (not shown) and a plurality of sync bits (not shown) disposed at prescribed intervals.

In this embodiment, the burst reference patterns 100 and 200 are written on part of an outer diameter (OD) of the disk 11, which serve to determine a ready status and a copy start location of the HDD.

In this embodiment, the reference servo pattern including the burst reference patterns 100 and 200 and the spiral reference patterns 110 and 210 is written on each disk 11 by an offline servo track writer. Generally, reference servo patterns are written at a time on 10 or more disks 11. This can more enhance productivity than in a case where reference servo patterns are written by a servo track writer.

After the step S100, align burst patterns 500 aligned with each other in a horizontal direction of the disk surface are written on the plurality of disks 11, by using a reference servo pattern of one of the plurality of disks 11 (S200).

In one embodiment of the conventional art, the reference servo patterns 500 and 600 (refer to FIG. 1) are servo-copied onto the final servo patterns 700 and 800 (refer to FIG. 1). Therefore, if the reference servo patterns 500 and 600 (refer to FIG. 1) of the plurality of disks are not aligned with each other, the final servo patterns 700 and 800 (refer to FIG. 1) are not aligned with each other in a horizontal direction of the disk surface.

However, in one embodiment, the align burst patterns 500 aligned with each other in a horizontal direction of the disk surface are firstly written on the plurality of disks 11, by using a reference servo pattern of one of the plurality of disks 11. The reason is in order to align the final servo patterns 300 and 400 formed by the plurality of disks 11 with each other in a horizontal direction of the disk surface, even if multi pass servo copy is performed in a case where the reference servo patterns of the disks 11 are not aligned with each other.

As to be explained in more details, the final servo patterns 300 and 400 written on the plurality of disks 11 can be aligned with each other in a horizontal direction of the disk surface, by using the align burst patterns 500 and the spiral reference patterns 110 and 210.

FIG. 7 is a flowchart illustrating a step of writing align burst patterns in the servo pattern writing method of an HDD shown in FIG. 6.

Referring to FIGS. 7 and 9, in order to write the align burst patterns 500, 'N'$^{th}$ read/write head having the burst reference patterns 100 and 200, among a plurality of read/write heads, is made to be in a ready status (S110).

Next, the 'N'$^{th}$ read/write head is moved to copy start locations of the burst reference patterns 100 and 200 (S120).

Then, the align burst patterns 500 are simultaneously copied onto the plurality of disks 11 by using the entire read/write heads, in a bank write manner, based on a spiral reference servo pattern of the 'N'$^{th}$ read/write head (S130).

Then, the aforementioned copy is performed on a subsequent track (S140).

Then, it is determined whether the current track number is smaller than the entire track numbers of the align burst patterns 500 (S150).

If the current track number is smaller than the entire track numbers of the align burst patterns 500, the copy is continuously performed. On the other hand, if the current track number is not smaller than the entire track numbers of the align burst patterns 500, the copy is terminated.

In such orders, the align burst patterns 500 are bank-copied onto part of an outer diameter (OD) by using a single reference burst pattern and a single spiral reference pattern, among the plurality of reference patterns. SIM/SAM(Servo Index Mark/Servo Address Mark) of the align burst patterns 500 on the disks 11 have third SIM/SAM, rather than SIM/SAM of the reference servo patterns or the final servo patterns 300 and 400.

Furthermore, the align burst patterns 500 are simultaneously written on the plurality of disks 11 in a bank write manner, by using the entire read/write heads, based on a single reference burst pattern and a single spiral reference pattern among the plurality of disks 11. As a result, as shown in FIG. 9, the align burst patterns 500 can be aligned with each other in a horizontal direction of the disk surface.

In this embodiment, in a case where the reference servo patterns of the disks 11 are not aligned with each other, the align burst patterns 500 aligned with each other along the surface of the disks 11 are written. Then, the final servo patterns 300 and 400 are written on the disks 11 by using the align burst patterns 500 and the spiral reference patterns 110 and 210 (S300).

FIG. 8 is a flowchart illustrating a step of writing final servo patterns in the servo pattern writing method of an HDD shown in FIG. 6.

Referring to FIGS. 8 and 9, a first read/write head to firstly perform servo copy is made to be in a ready status for the align burst patterns 500, and then is moved to a copy start location (A) (S210).

After the first head is made to be in a ready status for the align burst patterns 500, track seeking with respect to a copy start track is performed. Then, a jump to spiral operation is performed for execution of track following using the spiral reference patterns 110 and 210.

The jump to spiral indicates a process for converting the current track following using the align burst patterns 500, into track following using the spiral reference patterns 110 and 210.

In this case, servo sector timing of the final servo patterns 300 and 400 to be servo-copied is synchronized with sector timing of the align burst patterns 500. And, a position of a servo cylinder is also determined from a copy start track prescribed based on the align burst patterns 500. Therefore, if the align burst patterns 500 of the disks 11 are in an aligned status in a horizontal direction of the disk surface, the final servo patterns 300 and 400 respectively servo-copied to the disks 11 are also aligned with each other in a horizontal direction of the disk surface.

In the conventional art, if multi pass servo copy is performed by using a plurality of disks 11 formed by an offline servo track writer, each burst reference servo pattern has a different servo sector timing and track location. Therefore, the final servo patterns 300 and 400 formed by the respective reference servo patterns also have different servo sector timings and track locations, per disk 11.

More specifically, if the burst reference patterns 100 and 200 of the disks 11 have different servo sector timings and track locations, the final servo patterns 300 and 400 formed by the burst reference patterns 100 and 200 have different servo sector timings and track locations. As a result, the final servo patterns 300 and 400 are not aligned with each other.

However, according to embodiments of the present disclosure, the final servo patterns 300 and 400 are written on the disks 11 through multi pass servo copy, i.e., by firstly making the read/write head be in a ready status for the align burst patterns 500 aligned with each other between the disks 11, and then by seeking a copy start track. As a result, the final servo patterns 300 and 400 have the same servo sector timing and track location thus to be aligned with each other.

Next, the final servo patterns 300 and 400 are written on the disks 11 through a first read/write head by using the spiral reference patterns 110 and 210 (S220).

The process for writing the final servo patterns 300 and 400 on the disks 11 using the spiral reference patterns 110 and 210 is called 'servo copy', which will be explained in more details.

The spiral reference patterns 110 and 210 written on the tracks 13 of the disks 11 are read while following the tracks 13. Here, the spiral reference patterns 110 and 210 are written in correspondence to a prescribed frequency, i.e., a clock frequency. The clock frequency of a read/write channel circuit is locked in correspondence to a preamble 15a of the spiral reference patterns 110 and 210. Once the clock frequency of the read/write channel circuit is locked and a servo address mark is detected, a servo gate (SG) signal is generated. The read/write channel circuit serves to generate the final servo patterns 300 and 400, based on information from the spiral reference patterns 110 and 210 read-out by the read/write head 21 when the servo gate signal is valid.

Next, the aforementioned copy is performed on a subsequent track (S230).

Then, it is determined whether the current track number is smaller than the entire track numbers of the final servo patterns 300 and 400 (S240).

If the current track number is smaller than the entire track numbers of the final servo patterns 300 and 400, the servo copy is continuously performed. On the other hand, if the current track number is not smaller than the entire track numbers of the final servo patterns 300 and 400, it is determined whether the current read/write head number is smaller than the largest number among the entire read/write head numbers (S250).

If the current read/write head number is smaller than the largest number among the entire read/write head numbers, the current read/write head number is increased and the aforementioned processes are repeated.

On the other hand, if the current read/write head number is not smaller than the largest number among the entire read/write head numbers, it is determined that the final servo patterns 300 and 400 have been completely copied onto the disks 11. As a result, the multi pass servo copy is terminated.

In this embodiment, the align burst patterns 500 are written on the disks 11 in a bank copy manner, by using a reference servo pattern of one of the plurality of disks 11. Then, the final servo patterns 300 and 400 are servo-copied onto the disks 11 by using the align burst patterns 500 and the spiral reference patterns 110 and 210. This can allow the final servo patterns 300 and 400 on the plurality of disks 11 to have the same servo sector timing and track location. As a result, the final servo patterns 300 and 400 on the plurality of disks 11 can be aligned with each other in a horizontal direction of the disk surface.

Accordingly, the embodiments disclosed herein can solve a mis-align problem between servo tracks on different disks 11, the most serious problem in an offline multi pass servo copy method. This can enhance the quality of the servo-copied final servo patterns 300 and 400, and can allow an OLSTW method having high productivity even if bank servo copy cannot be implemented.

Hereinafter, a hard disk drive (HDD) manufactured by the servo pattern writing method of an HDD according to one embodiment will be explained in more details.

Figure 10:
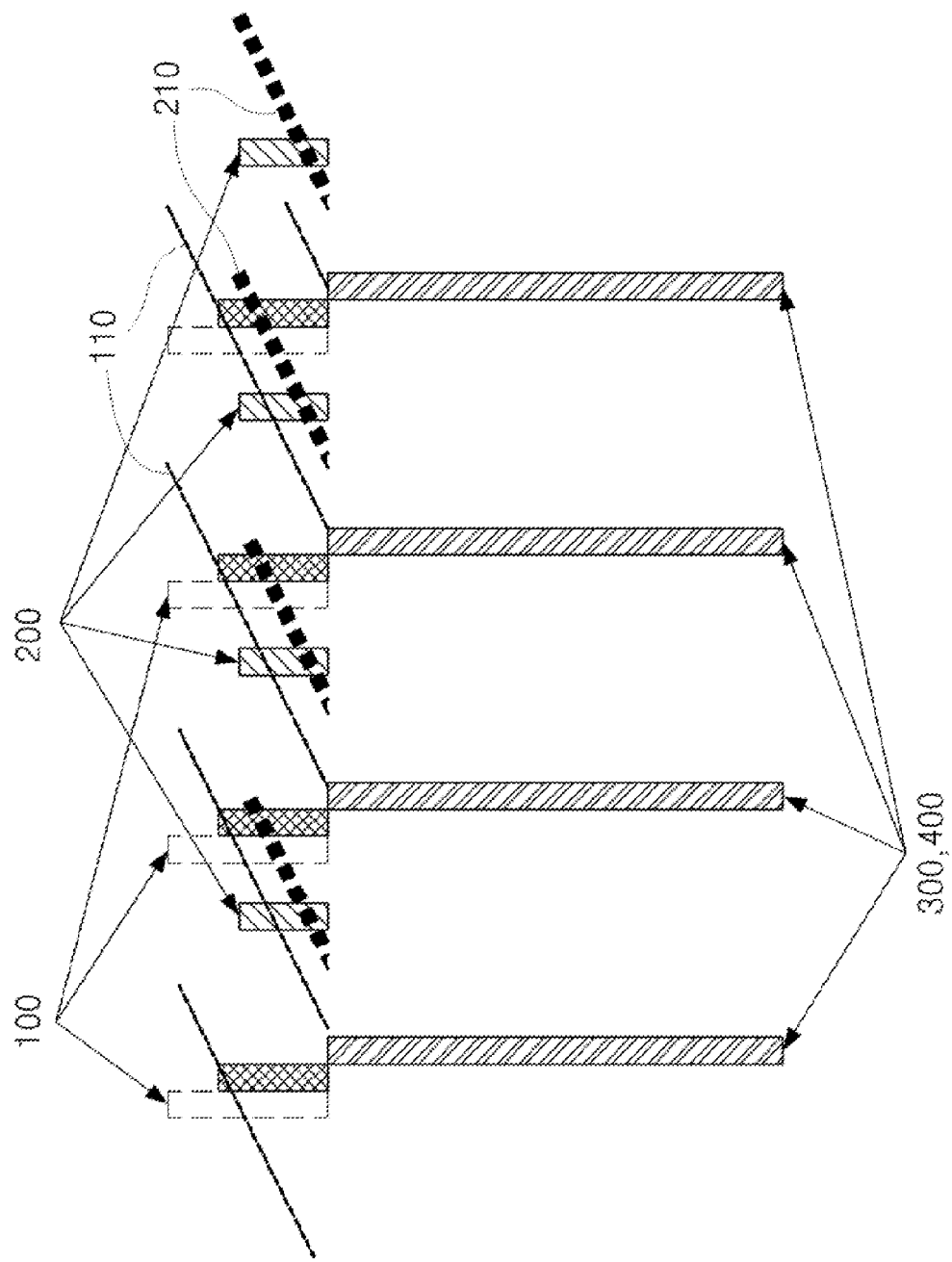
FIG. 10 is a view illustrating servo patterns on the same plane, the servo patterns remaining on two disks after a substantial process.

FIG. 10 is a view illustrating servo patterns on the same plane, the servo patterns remaining on two disks after a substantial process. As shown, during processing, the reference servo patterns 100, 110, 200 and 210 of the final servo patterns 300 and 400 are erased. On the other hand, the reference servo patterns 100, 110, 200 and 210 mis-aligned on an outer diameter (OD) than the final servo patterns 300 and 400 remain.

Figure 11:
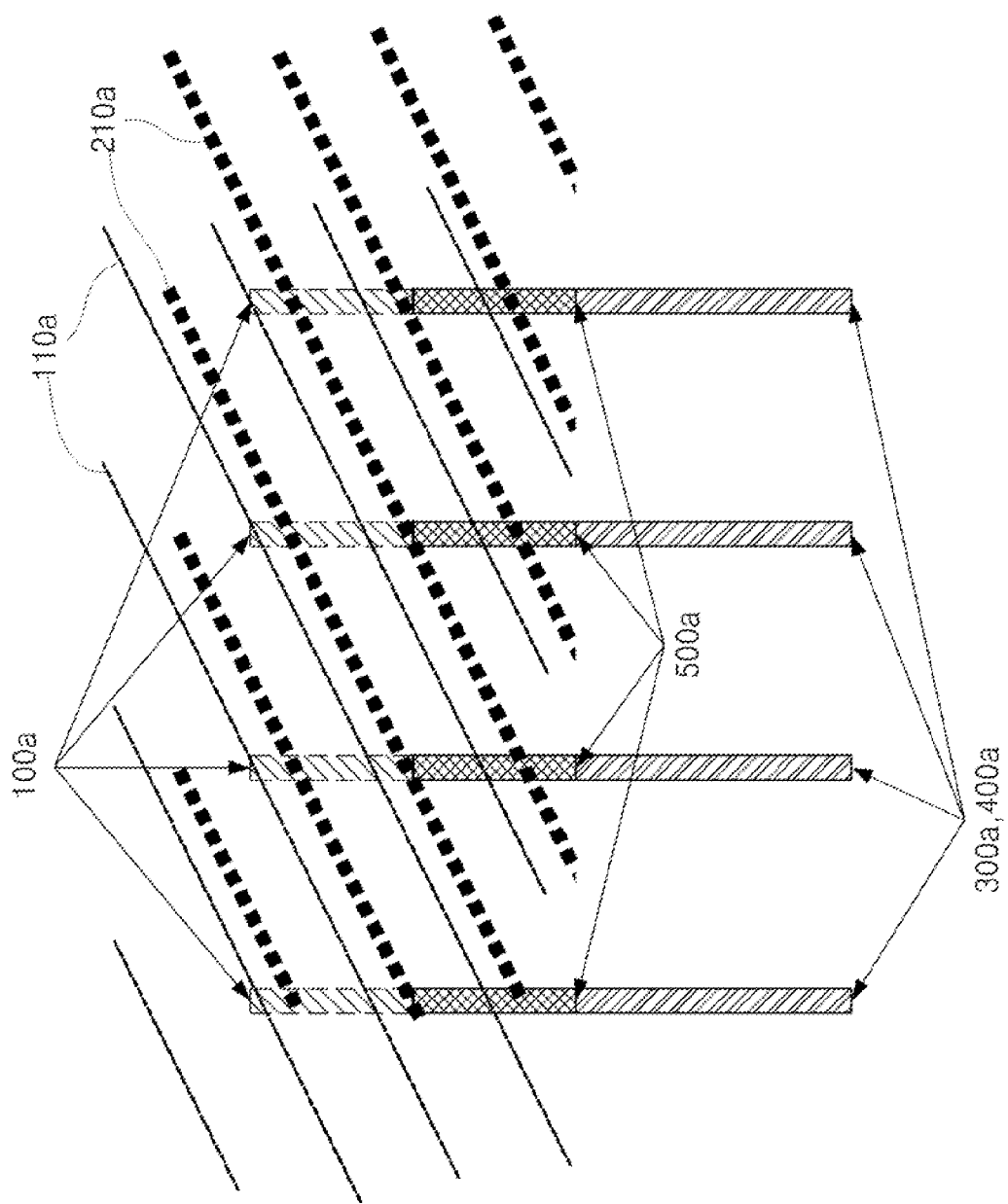
FIG. 11 is a view illustrating, on the same plane, other servo patterns remaining on two disks, after the servo pattern writing method of an HDD according to one embodiment of the present disclosure has been applied.

FIG. 11 is a view illustrating, on the same plane, other servo patterns remaining on two disks, after the servo pattern writing method of an HDD according to one embodiment of the present disclosure has been applied.

As shown in FIG. 11, a burst reference pattern 100a, an align burst pattern 500a, and final servo patterns 300a and 400a may be positioned to have the same timing. In this case, a burst reference pattern 100a and a spiral reference pattern 110a are written on the disk 1. On the contrary, the burst reference pattern 100a is not written, but a spiral reference pattern 210a is written on the disk 2. In this case, the spiral reference patterns 110a and 210a on the disk 1 and the disk 2, respectively are mis-aligned with each other.

The burst reference pattern 100a and the align burst pattern 500a disposed at an outer diameter (OD) than the final servo patterns 300a and 400a are not distinguished from the final servo patterns 300a and 400a. This may cause only the mis-aligned spiral reference patterns 110a and 210a, and the aligned final servo patterns 300a and 400a, to be viewed as remaining patterns.

In the aforementioned embodiment, the reference servo pattern includes the spiral reference pattern written on the disk in a spiral shape, and the burst reference pattern radially written on at least part of an outer diameter (OD) of the disk. And, the align burst pattern is moved to a copy start location of the burst reference pattern by the read/write head, and then is written by using the spiral reference pattern. However, the reference servo pattern may be a reference burst servo pattern applied to a burst method, among methods for writing a reference servo pattern, which may be radially written on the disk. In this case, the align burst servo pattern may be written by using the reference burst servo pattern, and then the final servo pattern may be written by using the align burst servo pattern.

In some embodiments, a servo pattern writing method of a hard disk drive (HDD) may comprise providing a plurality of disks having reference servo patterns written thereon, writing align patterns aligned with each other in a horizontal direction of the disk surface, on the plurality of disks, using a reference servo pattern of one of the plurality of disks, and writing a final servo pattern on each disk, using the align pattern written on each disk. An embodiment may also include wherein in step of providing a plurality of disks having reference servo patterns written thereon, the reference servo patterns are written on the plurality of disks by an offline servo track writer. An embodiment may also include wherein the reference servo pattern includes a spiral reference pattern written on the disk in a spiral shape. An embodiment may also include wherein the reference servo pattern further includes a burst reference pattern radially written on at least part of an outer diameter (OD) of the disk, and wherein the align pattern is an align burst pattern written on each of the plurality of disks, by using the spiral reference pattern of one of the plurality of disks, after a read/write head is moved to a copy start location of the burst reference pattern of one of the plurality of disks. An embodiment may also include wherein the step of writing align burst patterns include making one read/write head among a plurality of read/write heads be in a ready status, said one read/write head corresponding to the disk having the burst reference pattern, moving said one read/write head, to a copy start location of the burst reference pattern, and copying the align burst pattern using the entire read/write heads in a bank write manner, based on the spiral reference servo pattern of the disk corresponding to said one read/write head. An embodiment may also include wherein the step of writing a final servo pattern is a step of multi pass servo copy for performing servo copy using the align burst pattern and the spiral reference pattern each written on each disk. An embodiment may also include wherein the step of writing a final servo pattern includes making a read/write head to perform servo copy be in a ready status for the align burst pattern, and then moving the read/write head to a copy start location, after the read/write head is in a ready status for the align burst pattern, performing track seeking with respect to a copy start track, and then performing a jump to spiral operation for execution of track following using the spiral reference patterns, and writing a final servo pattern by the read/write head which is to perform servo copy, using the spiral reference pattern. An embodiment may also include wherein the reference servo patterns written on the plurality of disks are reference servo patterns mis-aligned with each other between the disks, in a horizontal direction of the disk surface. An embodiment may also include wherein the reference servo pattern written on each of the plurality of disks includes a spiral reference pattern written on the disk in a spiral shape, wherein the reference servo pattern written on at least one of the plurality of disks further includes a burst reference pattern radially written on at least part of an outer diameter (OD) of the disk, and wherein the reference servo patterns mis-aligned with each other between the disks are the spiral reference patterns.

In another embodiment, a hard disk drive may comprise a plurality of disks on which data is written, and a plurality of read/write heads configured to write or read out data onto/on the plurality of disks, wherein the plurality of disks include reference servo patterns mis-aligned with each other between the disks, in a horizontal direction of the disk surface, and final servo patterns aligned with each other between the disks, in a horizontal direction of the disk surface. An embodiment may also include wherein the plurality of disks further include align patterns aligned with each other between the disks, in a horizontal direction of the disk surface. An embodiment may also include wherein the reference servo pattern includes a burst reference pattern radially written on the disk, and a spiral reference pattern written on the disk in a spiral shape, wherein the align pattern is an align burst pattern radially written on the disk by using the burst reference pattern and the spiral reference pattern. An embodiment may also include wherein the align burst pattern is disposed between the burst reference pattern and the final servo pattern, in a circumferential direction of the disk. An embodiment may also include wherein the burst reference pattern, the align burst pattern and the final servo pattern are disposed on the same shaft in a radial direction of the disk. An embodiment may also include wherein the reference servo pattern is disposed at an outer diameter (OD) than the final servo pattern. An embodiment may also include wherein the reference servo pattern is a burst reference servo pattern radially written on the disk, and wherein the reference servo pattern further includes an align pattern written on the disk by using the burst reference servo pattern.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
    providing a plurality of data storage discs having reference servo patterns written thereon, the reference servo patterns including a burst reference pattern radially written on the data storage discs;
    writing align patterns on the plurality of data storage discs based on the reference servo pattern of one of the plurality of data storage discs, the align patterns aligned with each other in a horizontal direction of the surface of the data storage discs; and
    writing a final servo pattern on each data storage disc, using the align pattern written on each disc.

2. The method of claim 1, wherein the reference servo patterns are written on the plurality of data storage discs by an offline servo track writer.

3. The method of claim 1, wherein the reference servo patterns written on the data storage discs include a spiral reference pattern written on each disc in a spiral shape.

4. The method of claim 3, further comprising
    the align pattern is an align burst pattern written on each of the plurality of data storage discs, by using the spiral reference pattern of one of the plurality of data storage discs, after a transducer is moved to a copy start location of the burst reference pattern of one of the plurality of data storage discs.

5. The method of claim 4, wherein writing align burst patterns includes:
    readying one transducer head among a plurality of transducer heads, the one transducer head corresponding to the data storage disc having the burst reference pattern;
    moving the one transducer head to a copy start location of the burst reference pattern; and
    writing the align burst pattern using the plurality of transducer heads in a bank write manner, based on the spiral reference pattern of the data storage disc corresponding to the one transducer head.

6. The method of claim 4, wherein writing the final servo pattern includes using multi pass servo copy for performing servo copy using the align burst pattern and the spiral reference pattern written on each data storage disc.

7. The method of claim 4, wherein writing the final servo pattern includes:

making a current transducer head among the plurality of transducer heads to perform servo copy be in a ready status for the align burst pattern, and then moving the current transducer head to a copy start location;

performing track seeking with respect to a copy start track, and then performing a jump to spiral operation for execution of track following using the spiral reference patterns; and writing a final servo pattern by the current transducer head which is to perform servo copy, using the spiral reference pattern.

8. The method of claim 1, wherein the reference servo patterns written on the plurality of data storage discs are reference servo patterns mis-aligned with each other between the disks, in a horizontal direction of the disk surface.

9. The method of claim 8, wherein the reference servo patterns written on the plurality of data storage discs include a spiral reference pattern written on each data storage disc in a spiral shape;

wherein the reference servo pattern written on at least one of the plurality of data storage discs further includes a burst reference pattern radially written on at least part of an outer diameter (OD) of the data storage disc; and wherein the reference servo patterns mis-aligned with each other between the data storage discs are the spiral reference patterns.

10. An apparatus comprising:
a plurality of data storage discs, the plurality of data storage discs including:
reference servo patterns, the reference servo patterns including a burst reference pattern radially written on the data storage discs;
final servo patterns aligned with each other between the data storage discs in a horizontal direction of the surface of the data storage discs, the final servo patterns written based on the reference servo patterns; and
a plurality of transducer heads configured to write or read data on the plurality of data storage discs.

11. The apparatus of claim 10, wherein the plurality of data storage discs further include align patterns aligned with each other between the data storage discs, in a horizontal direction of the surface of the data storage discs.

12. The apparatus of claim 11, further comprising
the reference servo patterns further includes
a spiral reference pattern written on the data storage discs in a spiral shape; and
the align patterns are align burst patterns radially written on the data storage discs by using the burst reference pattern and the spiral reference pattern.

13. The apparatus of claim 11, wherein the align burst patterns are disposed between the burst reference pattern and the final servo pattern, in a circumferential direction of each of the plurality of data storage discs.

14. The apparatus of claim 11, wherein the burst reference patterns, the align burst patterns and the final servo patterns are disposed on the same shaft in a radial direction of each of the plurality of data storage discs.

15. The apparatus of claim 10, wherein the reference servo patterns are disposed at a farther outer diameter (OD) than the final servo patterns.

16. The apparatus of claim 10,
wherein the reference servo pattern further includes an align pattern written on each of the plurality of data storage discs by using the burst reference servo pattern.

17. An apparatus comprising:
a first data storage disc including:
a servo reference pattern including burst reference patterns radially written on the first data storage disc;
a first align pattern positioned on the first data storage disc based on the servo reference patterns;
a second data storage disc; and
both the first data storage disc and the second data storage disc including final servo patterns aligned horizontally between the first data storage disc and the second data storage disc.

18. The apparatus of claim 17 further comprising:
the second data storage disc including a second align pattern based on based on the servo reference pattern of the first data storage disc; and
the final servo patterns on the second data storage disc a written based on the second align pattern.

19. The apparatus of claim 17 further comprising:
the servo reference pattern includes a spiral reference pattern written on the first data storage disc in a spiral pattern; and
the first align pattern positioned based on the burst reference patterns and the spiral reference pattern.

20. The apparatus of claim 19 further comprising:
the second data storage disc includes a second servo reference pattern including burst reference patterns and spiral reference pattern.

* * * * *